United States Patent [19]

Rasmussen et al.

[11] 3,765,648

[45] Oct. 16, 1973

[54] SUPPORT APPARATUS

[76] Inventors: Reed Rasmussen, 168 West Gentile, Layton, 84041; Carl M. Rasmussen, 197 East 1400 South, Bountiful, 84010, both of Utah

[22] Filed: Sept. 7, 1971

[21] Appl. No.: 177,957

[52] U.S. Cl. ............................................... 254/47
[51] Int. Cl. ............................................... B66f 7/26
[58] Field of Search.................... 254/45, 47, 147, 254/148, 184; 187/8.59; 214/515

[56] References Cited
UNITED STATES PATENTS

| | | | |
|---|---|---|---|
| 3,164,275 | 1/1965 | Schatzl | 254/47 |
| 2,648,521 | 8/1953 | Sales | 254/47 |
| 3,305,216 | 2/1967 | Gennard | 254/47 |
| 3,414,087 | 12/1968 | Schmiesing | 254/148 |

*Primary Examiner*—Othell M. Simpson
*Assistant Examiner*—Robert C. Watson
*Attorney*—H. Ross Workman

[57] ABSTRACT

Elevating and leveling apparatus for campers and other transportable objects, one preferred apparatus embodiment including a plurality of telescoping legs, one of which is extended and retracted by power means. A cable is anchored to another telescoping leg and traverses stationary-axis pulleys so that the other leg extends and retracts concurrently with the one leg. In another presently preferred embodiment, a plurality of telescoping legs are mounted upon the transportable object and the extensible portion of each telescopic leg is provided with a pulley near the upper end and the fixed portion of each leg is provided with a pulley near the lower end. A cable traverses each pulley and extends between the legs so that when the cable is shortened or displaced out of its normal path, each of the legs will simultaneously extend to uniformly lift the transportable object. Conversely, when the length of the cable is increased or when the cable is allowed to resume its normal path, the legs will simultaneously retract. The method includes jointly extending or retracting telescoping legs by displacing a cable connecting the legs. Alternatively, the method includes power displacing one leg and causing simultaneous displacement of another leg through a connecting cable.

9 Claims, 9 Drawing Figures

Patented Oct. 16, 1973
3,765,648
2 Sheets-Sheet 1
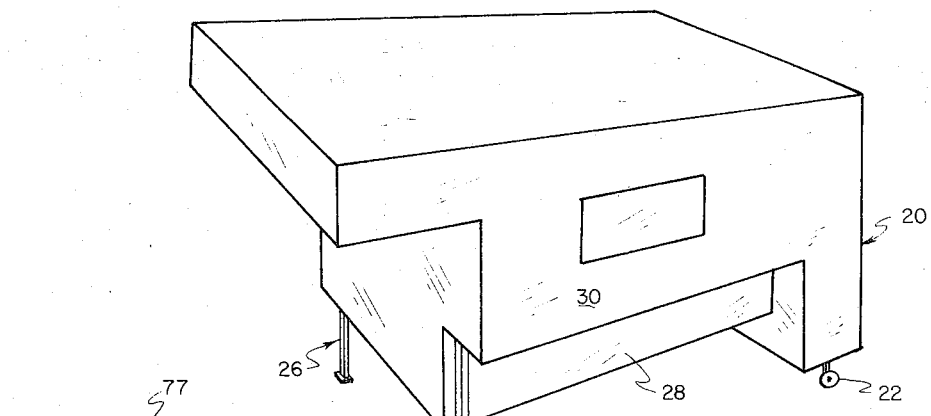
FIG. 1
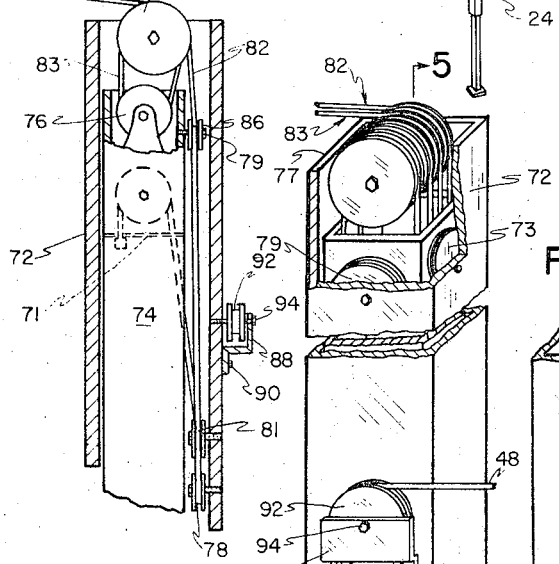
FIG. 4
FIG. 5
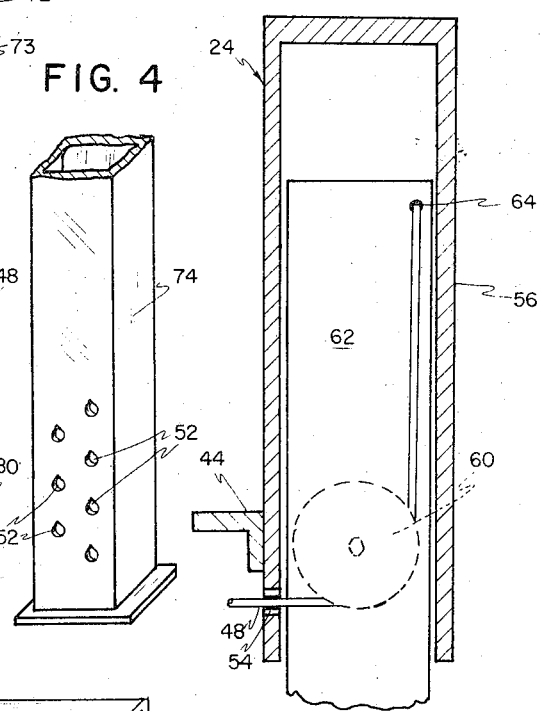
FIG. 6
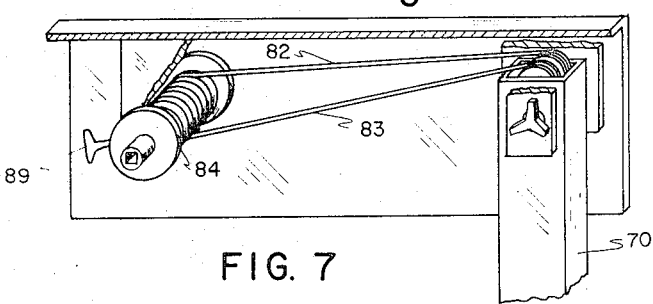
FIG. 7
INVENTORS.
REED RASMUSSEN
CARL M. RASMUSSEN
BY  H. Ross Storkman
ATTORNEY Patented Oct. 16, 1973

INVENTORS.
REED RASMUSSEN
CARL M. RASMUSSEN

BY *H. Rose Horkman*

ATTORNEY 3,765,648

SUPPORT APPARATUS

BACKGROUND

1. Field of the Invention

This invention relates to support apparatus and method and more particularly to apparatus and method of elevating and lowering a transportable object such as a camper and for quickly and easily leveling the object, when desired.

2. The Prior Art

It has long been desirable for truck campers to have supporting legs which support the camper in a generally horizontal orientation after the camper has been removed from a truck bed. In supporting the camper in a preferred orientation upon the ground, there are two specific processes which require attention. First of all, the elevation of the camper must be adjusted to a preferred height after the camper has been removed from the truck. Secondly, once the preferred elevation is established, each of the support legs which carries the camper must be adjusted so that the camper is substantially level.

One of the common ways in which campers are supported is by placing a leg at each corner of the camper, the leg being held by a conforming bracket. In using support apparatus of this type, it has historically been the practice to extend two of the legs adjacent the rear of the camper to approximately the preferred elevation for the camper, and thereafter, tightening the brackets so that the leg has no opportunity for vertical movement. Thereafter, either before or after the camper has been totally removed from the truck, the front legs are adjusted and tightened in the horizontal position. The camper is then leveled by individually adjusting the extension of each of the corner legs.

Desirable improvements have been recently made to include telescoping legs, each being independently extensible by use of a screw or the like to adjust the height of the camper. An example of this type leg is illustrated in U. S. Pat. No. 3,409,272. Unfortunately, however, in order to adequately adjust the elevation of the camper and also in order to level the camper, each of the extensible legs must be individually and separately adjusted.

The telescoping leg structure has been modified to include various types of power means for extending the leg, including hydraulic power means. Nevertheless, until this present invention, it was necessary for the extension of each of the legs to be independently adjusted. Independent adjustment of the legs can be a severe disadvantage. Not only is the process tedious, consuming much time and energy, but a danger exists when, for example, one of the legs becomes shortened too quickly. In that event there is a substantial risk that the camper can tumble to one side, causing damage to the camper and risking injury to the operator.

BRIEF SUMMARY AND OBJECTS OF THE INVENTION

The present invention provides extensible support structure attached to a camper or other transportable object at a plurality of locations on the camper or object. The support structure elevates or lowers the camper or other transportable object at the plurality of locations, simultaneously. Moreover, apparatus and method is provided for quickly and easily leveling the camper either concurrently with the elevating step or independent of the elevating step.

It is, therefore, a primary object of the present invention to provide improved apparatus for supporting a transportable object.

It is another primary object of the present invention to provide novel methods for elevating and leveling a transportable object.

These and other objects and features of the present invention will become more fully apparent from the following description and appended claims taken in conjunction with the accompanying drawings.

BRIEF DESCRIPTION OF THE DRAWINGS

FIG. 1 is a schematic perspective illustration of a conventional camper unit supported by structure according to the present invention;

FIG. 4 is a fragmentary perspective illustration of another presently preferred power extensible support leg embodiment;

FIG. 5 is a cross-sectional view taken along line 5—5 of FIG. 4;

FIG. 6 is a fragmentary cross-sectional view of a dependent support leg usable with the leg of FIG. 4;

FIG. 7 is a fragmentary perspective illustration of the leg structure of FIG. 4 and the associated power applying apparatus in mounted position upon a transportable object.

DETAILED DESCRIPTION OF THE PREFERRED EMBODIMENTS

Figure 2:
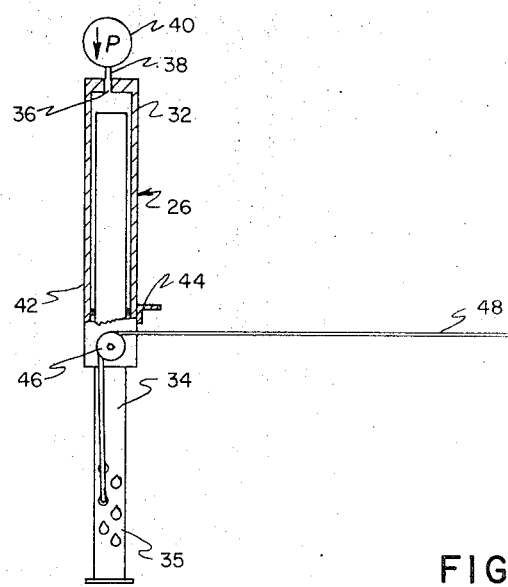
FIG. 2 is a schematic elevation of presently preferred apparatus accommodating concurrent extension and retraction of support legs.
Figure 3:
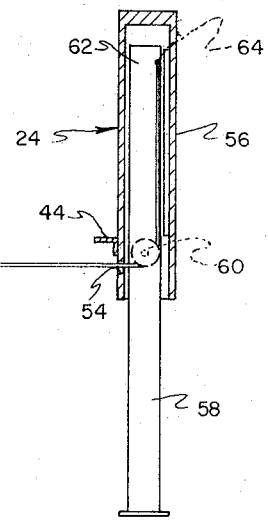
FIG. 3 is a fragmentary perspective illustration of one presently preferred mode of attaching a cable to a telescoping support leg.

The Embodiment of FIGS. 1–3

While the support apparatus comprising the present invention can be used on any one of a wide variety of transportable objects, the most common use of the illustrated embodiments has been in connection with truck campers such as a camper generally designated 20 illustrated in FIG. 1. The camper 20 comprises rear legs 22 and forward legs 24 and 26, respectively. The legs 24 and 26 are shown as mounted to the camper body along the recessed wall 28. Clearly, however, the leg 24 may be mounted at any suitable location on the camper including the peripheral side edge 30.

Referring now to FIG. 2, the support legs 24 and 26 are schematically shown. Support leg 16 has an exterior housing 32 into which an extensible inner member 34 is telescopically disposed. The exterior housing 32 has a port 36 into which is connected a fluid line 38 interposed between the housing 32 and a conventional fluid pump 40. A fluid seal 42 is mounted peripherally upon the inner wall of the housing so as to maintain fluid from pump 40 between the inner member 34 and the interior walls of the housing 32. Thus, it can be appreciated that the housing 32 comprises a hydraulic cylinder, the extensible leg 34 forming the cylinder piston.

When pressure is forced into the housing 32, the extensible leg 34 will extend telescopically out of the housing 32. Preferably, opposing brackets 44 are mounted upon the exterior housing 32 and also upon the exterior housing 56 to form support plates for the body of camper 20.

A pulley 46 is rotatably mounted upon the exterior surface of the housing 32. The pulley accommodates a cable 48, preferably formed of metal or other durable material. The cable 48 has, at its one end, an integral nub 50 shown best in FIG. 3. The nub 50 has a diametral dimension which is larger than the diameter of cable 48 and is used to anchor the cable 48 to the extensible inner member 34 of leg 26. As shown in both FIGS. 2 and 3, leg 46 has a plurality of spaced apertures 52, which have a tapered portion near the top thereof. The apertures 52 are sufficiently large to accommodate insertion of the nub 50 and at the same time prevent inadvertent disengagement of the nub 50 when the cable 48 is urged into the tapered portion of the aperture.

As illustrated in FIG. 2, the cable 48 is stretched between support leg 26 and support leg 24. The cable 48 passes through an aperture 54 in the exterior housing 56 of leg 24. Housing 56 is substantially similar to housing 32 except that housing 56 does not include a hydraulic system for telescopically displacing the inner member 58 of support leg 24. Instead, the exterior housing 56 is internally provided with a rotatable pulley 60, shown in dotted lines in FIG. 2. The cable 48 traverses the pulley 60 and is anchored in the upper end 62 of the extensible inner member 58. If desired, the other end of cable 48 may be provided with a nub 64 which anchors into a tapered aperture in the upper end 62 of inner member 58 in a manner substantially similar to the anchoring of one end 50 into the inner member 34 illustrated in FIG. 3. Furthermore, if desired, the pulley 60 may be located exterior of housing 56.

The method of FIGS. 1–3 can best be understood by referring again to FIG. 2. As pressure is communicated from the pump 40 to the interior of the housing 32, the inner member 34 is forced downwardly as shown in FIG. 2. As the inner member 34 extends, the cable 48, anchored to the lower end 35 of the extensible inner member 34, is moved toward the left as shown in FIG. 2. Concurrently, the cable exerts a downward force on the extensible inner member 58 of the support leg 24. Thus, the leg 24 extends concurrently with leg 26, even through hydraulic pressure is directly applied only in leg 26.

When the one end of cable 50 is anchored in one of the central apertures as shown in FIG. 2, the effective length of legs 24 and 26 will be substantially identical. However, if the camper is not on level ground, it may be desirable to anchor the cable 48 in other apertures. For example, if the nub 50 of cable 48 were anchored in the uppermost aperture, leg 26 could extend several inches before leg 24 would begin to extend concurrently with leg 26. Conversely, if the nub 50 were anchored into the lowermost aperture of the extensible member 34, the leg 24 would be extended so as to have an effective length of as much as several inches longer than leg 26. If desired, leg 24 can be rested on a pin or other restraint (not shown) and the cable 48 can be disconnected and leg 26 operated independently to facilitate leveling.

Support legs 24 and 26 are illustrated for convenience as being mounted near the front of the camper. Clearly, the legs could be mounted near the rear of the camper. Furthermore, it is within the scope and contemplated use of this invention to connect a plurality of cables to the power leg 26 to be connected to dependent legs, for example, near each of four corners of the camper 20.

The Embodiment of FIGS. 4–7

The embodiment of FIGS. 4–7 is substantially similar in many respects to the embodiment of FIGS. 1–3, like parts having like numerals throughout. The embodiment of FIGS. 4–7 differs from the previous embodiment in that a system of pulleys and a take-up winch is utilized to extend and retract the telescoping support leg 70. With continued reference to FIG. 4, the leg 70 comprises an exterior housing or member 72 and an inner extensible member 74. The inner member 74 is substantially similar to member 34 (FIG. 2) except that the upper portion thereof is provided with an array of pulleys 76. The pulley array 76 is secured to the inner member 74 so as to reciprocate with the member 74 as it telescopically extends and retracts within the housing 72.

The housing 72, has, interior thereof, pulleys 78, 79, 80 and 81 which are rotatably attached to the interior walls of housing 72. A pulley array 77 is rotatably mounted interior of the housing 72 adjacent the top thereof. A connecting cable 82 traverses the pulleys 73, 78, 79, 80, 81 and the pulley array 77 and is secured to a winch or take-up mandrel generally designated 84 (FIG. 7). A second cable 83 traverses pulley arrays 76 and 77 and also is secured to winch 84. Both cables 82 and 83 are anchored to plate 71 interior of member 74. When the winch 84 is turned with a suitable handle (not shown), the length of cable 82 will be shortened so that the pulleys 79 and 73 will be forced toward the pulleys 78, 80 and 81 thereby extending the inner member 74 to increase the effective length of leg 70. If desired, a conventional ratchet locking mechanism 88 may be used to prevent inadvertent release of the cable 82. Concurrently, cable 83 is lengthened from winch 84 to accommodate the extension. By reversing the direction of rotation of the winch, the cable 83 is shortened to draw pulley array 76 to pulley array 77 so as to retract the inner member 74.

Referring again to FIG. 4, the outer member 72 has an exterior bracket 88 secured thereto such as with bolts 90. Bracket 88 supports a pulley 92 rotatably upon shaft 94. The pulley 94 serves the same function as pulley 46 (FIG. 2) by accommodating a change of direction of cable 48 to facilitate attachment of the cable 48 into the apertures 52 of inner member 74. As can be appreciated by reference to FIG. 6, cable 48 traverses a pulley 60 mounted upon the exterior 56 of leg 24. Leg 24, illustrated in FIG. 6, is substantially the same in structure and operation as leg 24 illustrated in FIG. 2.

As the winch or take-up mandrel 84 is rotated in one direction, the support leg 70 will be lengthened when the inner member 74 extends out of the outer member 72. When the cable 48 is anchored in one of the apertures 52 in the inner member 74, the cable 48 will be displaced toward the left as shown in FIG. 6 thereby forcing the inner member 62 out of the exterior member 56 so that leg 24 is simultaneously extended. Conversely, when the winch 84 is rotated in the opposite direction, both legs 70 and 24 will be simultaneously retracted.

Figure 9:
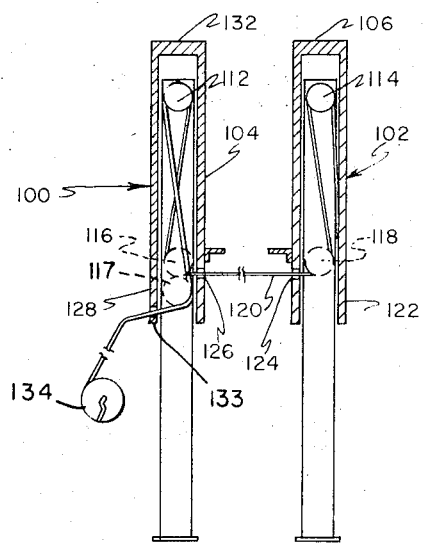
FIGS. 8 and 9 schematically illustrate alternative self-leveling leg embodiments of the invention.
Figure 8:
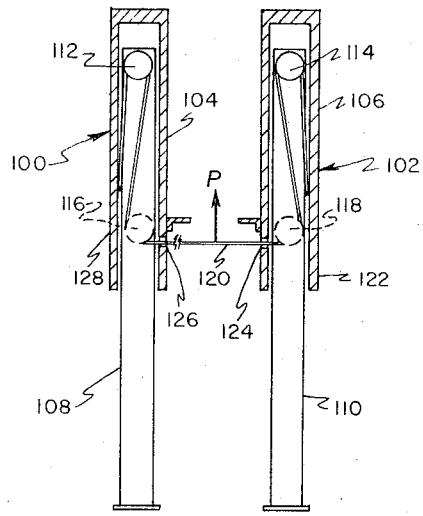

The Embodiment of FIGS. 8 and 9

The embodiments of FIGS. 1–3 and 4–7, above described, each disclose one leg which is power-displaced to an extended and/or retracted position and a secondary or dependent leg which is extended or retracted in response to the energy or force applied to the first leg (see FIG. 2, for example). The embodiment of FIGS. 8 and 9 differs from the foregoing embodiments principally in that the extensible force conducted essentially uniformly through both legs is dependent upon a displacing force exerted upon a connecting cable.

The differences will be more specifically understood by reference to FIG. 8. As shown in FIG. 8, legs generally designated 100 and 102 are schematically illustrated in side-by-side relation. It should be appreciated that although two legs are shown any plural number of legs in excess of two could be used according to the present invention. Each leg has an exterior housing or receiving member 104 and 106. Similarly, each leg 100 and 102 has a corresponding inner telescoping member 108 and 110. Each of the inner telescoping members 108 and 110 has a corresponding pulley 112 and 114, respectively adjacent the upper end thereof. Similarly, each of the exterior members 104 and 106 has a corresponding pulley 116 and 118 rotatably journaled thereto. The pulley may be exterior or interior of the members 104 and 106, as desired.

A connecting cable 120 has one end anchored to the exterior member 106 intermediate the length of the member, preferably adjacent the lower end 122. The cable 120 traverses the upper pulley 114, the pulley 118 and, where pulley 118 is an interior pulley, projects through an aperture 124 in the exterior member 106.

The cable then enters the exterior member 104 through an aperture 126, similar in intent and purpose to aperture 124. The cable traverses the pulleys 116 and 120 and is anchored to the member 104 adjacent its lower end 128. Preferably, conventional structure is connected to an intermediate length of the cable 120 so as to displace the cable 120, for example, in the direction of arrow P, when desired. An example of suitable conventional structure may include a hydraulic cylinder (not shown) mounted adjacent the bottom of camper 20 (FIG. 1), the extensible piston of which is attached to the intermediate portion of cable 120. When the cylinder piston (not shown) is extended, the cable 120 is displaced out of its natural path thereby exerting a displacing force on the cable so as to urge the pulleys 104, 116 and 114, 118 toward one another. The mentioned displacement will extend the inner members 108 and 110 thereby lengthening the supporting legs 100 and 102. Conversely, when the cable 120 is allowed to resume its natural position, natural weight of the camper on the legs 108 and 110 will telescope the inner members into the exterior members 104 and 106.

This presently preferred embodiment of the invention has a particular advantage worth noting. If a camper having supporting legs 100 and 102 is situated upon uneven or sloping terrain, displacement of the cable 120 will cause the support legs 100 and 102 to extend ununiformly until each engages the ground. One of the support legs 100 or 102 may be required to extend several inches beyond the other before both legs engage the ground. Thus, it is presently preferred that lateral or "in line" displacement of the cable 120 be accommodated even during the step of forcing the cable out of its natural path. As long as the cable has freedom for "in line" displacement, legs 100 and 102 can extend one independent of the other until the ground is engaged. Thereafter, continued displacement of cable 120 will cause an equal force to be exerted through the support legs so that the camper remains level as it is elevated even though the ground surface supporting the camper is not level.

Reference is now made to the embodiment of FIG. 9 which is substantially the same in many respects as the embodiment of FIG. 8, like parts having like numerals throughout. The FIG. 9 embodiment differs from the FIG. 8 embodiment particularly in that the cable 120 is projected through an aperture (not shown) adjacent the lower end 133 of leg 100. The cable 120, after traversing pulleys 112 and 117 projects through the aperture (not shown) and is connected to a take-up mandrel or winch 134. Extension and retraction of the support legs 100 and 102 occurs substantially as described in the FIG. 8 embodiment except that the cable 120 is shortened or lengthened depending upon the direction of rotation of the winch 134.

Clearly, the operation of support legs 100 and 102 is not dependent upon the type of apparatus used for displacing the cable 120. Rather, any suitable apparatus for displacing the cable which exerts a closing force between pulleys 112, 116 and 114, 118 is suitable.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. Apparatus for a transportable object having a primary supporting leg and at least one secondary supporting leg, each comprising a first and second member, the second member being longitudinally displaceable relative to the first comprising:

power means acting downwardly upon the secondary member of the primary supporting leg to selectively extend the second member relative to the first;

single connecting means connecting the second member of the primary supporting leg to the second member of the secondary supporting leg so that extension of the second member of the primary leg concurrently extends the second member of the secondary leg a corresponding distance; and means for selectively adjusting the location of the attachment of the connecting means to the second member of one of the primary and secondary supporting legs.

2. Apparatus as defined in claim 1 wherein said power means comprises a winch and pulley combination connected by cables to form a tackle.

3. Apparatus as defined in claim 1 wherein said power means comprises a hydraulic cylinder and an extendible hydraulic piston.

4. Apparatus as defined in claim 1 wherein said single connecting means comprises a cable which is (a) anchored to the top of the second member of the secondary leg and (b) movably supported at fixed locations on the first members of both the primary and secondary legs and (c) anchored to the second member of the primary leg near the bottom thereof.

5. Apparatus as defined in claim 4 further comprising means for receiving an anchoring fastener at any one of a plurality of vertical locations along the second member of the primary leg.

6. Apparatus for supporting on uneven terrain a transportable object having at least two supporting legs, each leg comprising a first and a second member, the second member being longitudinally extensible relative to the first, comprising:
   means accommodating a change of direction of a pulling force, at least one of said accommodating means being mounted on each of the first and second members of the supporting legs;
   a flexible line serially traversing the accommodating means of the first and second members of both of the supporting legs;
   means accommodating independent extensibility of the second member of each leg in response to displacement of the flexible line; and
   means for exerting a displacing force on the flexible line to urge extension of each second member relative to its corresponding first member, the extensibility of the one leg being greater than the other leg so as to maintain the object level when supported upon uneven terrain.

7. Apparatus as defined in claim 6 wherein said accommodating means comprises at least one pulley.

8. Apparatus as defined in claim 6 wherein said exerting means comprises a winch for varying the length of the line.

9. Apparatus as defined in claim 6 wherein said exerting means comprises means for displacing the line out of its normal path.

* * * * *